(12) United States Patent
Shibata et al.

(10) Patent No.: US 12,531,492 B2
(45) Date of Patent: Jan. 20, 2026

(54) ELECTRICAL STORAGE DEVICE

(71) Applicant: HONDA MOTOR CO., LTD., Tokyo (JP)

(72) Inventors: Kenji Shibata, Wako (JP); Yasuhiro Nakada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 506 days.

(21) Appl. No.: 18/121,284

(22) Filed: Mar. 14, 2023

(65) Prior Publication Data

US 2023/0216430 A1 Jul. 6, 2023

Related U.S. Application Data

(63) Continuation of application No. PCT/JP2020/040691, filed on Oct. 29, 2020.

(51) Int. Cl.
*H02M 7/5387* (2007.01)
*B60R 16/033* (2006.01)
(Continued)

(52) U.S. Cl.
CPC ......... *H02M 7/5387* (2013.01); *H01M 10/46* (2013.01); *H01M 10/482* (2013.01);
(Continued)

(58) Field of Classification Search
CPC .... H02M 7/5387; H01M 50/51; H01M 10/46; H01M 10/482; H02J 7/007182; H02J 7/0047
See application file for complete search history.

(56) References Cited

U.S. PATENT DOCUMENTS 6,426,608 B2 7/2002 Amano et al.
9,406,982 B2 8/2016 Obata
(Continued)

FOREIGN PATENT DOCUMENTS

CN 104025414 A 9/2014
CN 105990875 A 10/2016
(Continued)

OTHER PUBLICATIONS

Office Action dated May 25, 2024, issued in counterpart CN Application No. 202080105190.7, with English translation. (14 pages).

(Continued)

*Primary Examiner* — Sarah A. Slifka
(74) *Attorney, Agent, or Firm* — WHDA, LLP

(57) ABSTRACT

A device includes a battery module, and an inverter configured to convert a DC voltage output from the battery module into an AC voltage. The battery module includes battery cells connected in series, and a state detection unit configured to detect a state of each battery cell of the battery cells. An output voltage of the battery cells is input to the inverter without being stepped up. At least some battery cells of the battery cells are reused battery cells. The electrical storage device includes a switching unit configured to connect/disconnect an electrical connection between the battery cells and the inverter. The switching unit is controlled into a disconnected state when a voltage of the battery cells or the DC voltage on an input side of the inverter exceeds a threshold.

5 Claims, 3 Drawing Sheets

(51) Int. Cl.
  *H01M 10/46*    (2006.01)
  *H01M 10/48*    (2006.01)
  *H01M 50/51*    (2021.01)
  *H02J 7/00*     (2006.01)

(52) U.S. Cl.
  CPC .......... *H01M 50/51* (2021.01); *H02J 7/0047* (2013.01); *H02J 7/007182* (2020.01); *B60R 16/033* (2013.01); *H02J 2207/20* (2020.01)

(56) References Cited

U.S. PATENT DOCUMENTS

| 11,190,036 | B2 | 11/2021 | Hiratsuka |
| 2015/0303731 | A1 | 10/2015 | Takahashi et al. |

FOREIGN PATENT DOCUMENTS

| CN | 109245274 A | 1/2019 |
| JP | 2002-10408 A | 1/2002 |
| JP | 2003-289630 A | 10/2003 |
| JP | 2006-296109 A | 10/2006 |
| JP | 2010098782 A | 4/2010 |
| JP | 2013-110069 A | 6/2013 |
| JP | 2016-178740 A | 10/2016 |
| JP | 6323822 B1 | 5/2018 |
| JP | 2020-61335 A | 4/2020 |

OTHER PUBLICATIONS

International Search Report dated Jan. 12, 2021, issued in counterpart International Application No. PCT/JP2020/040691, with English Translation. (5 pages).

International Preliminary Report on Patentability (Form PCT/IPEA/409) of International Application No. PCT/JP2020/040691 dated Nov. 9, 2021. (14 pages).

ELECTRICAL STORAGE DEVICE

CROSS-REFERENCE TO RELATED APPLICATION(S)

This application is a Continuation of International Patent Application No. PCT/JP2020/040691, filed Oct. 29, 2020, the entire disclosures of which is incorporated herein by reference.

BACKGROUND OF THE INVENTION

Field of the Invention

The present invention relates to an electrical storage device that outputs an AC voltage.

Description of the Related Art

A device including a battery is known as a device that supplies electric power. Japanese Patent Laid-Open No. 2003-289630 discloses a power storage device including a module battery in which a plurality of cells are connected in series and a power conversion device which is a bidirectional inverter. Japanese Patent Laid-Open No. 2002-10408 discloses an automobile power supply that includes a plurality of batteries and a bidirectional inverter and has two voltage systems without requiring a DC/DC converter by switching a connection relationship between the batteries and the bidirectional inverter.

The use of the DC/DC converter causes an increase in a cost. On the other hand, a high voltage is required as a DC output voltage of the battery if there is no DC/DC converter in a case where the DC output voltage of the battery is converted by the inverter to obtain an AC output voltage. In a case where the battery is configured by connecting a plurality of battery cells in series, the number of the battery cells increases in order to obtain the high voltage, which causes an increase in a cost. Therefore, a cost advantage obtained by not using the DC/DC converter disappears.

SUMMARY OF THE INVENTION

An object of the present invention is to provide an electrical storage device that can be configured at a relatively low cost.

According to an aspect of the present invention, there is provided an electrical storage device comprising: a battery module configured to output a DC voltage; and a DC/AC inverter configured to convert the DC voltage output from the battery module into an AC voltage and outputs the AC voltage, wherein the battery module includes: a plurality of battery cells connected in series; and a state detection unit configured to detect a state of each battery cell of the plurality of battery cells, an output voltage of the plurality of battery cells is input to the DC/AC inverter without being stepped up, at least some battery cells of the plurality of battery cells are reused battery cells, the electrical storage device further comprising: a switching unit provided in the battery module and configured to connect/disconnect an electrical connection between the plurality of battery cells and the DC/AC inverter; a voltage detection unit provided in the DC/AC inverter and configured to detect the DC voltage on an input side of the DC/AC inverter; a first control unit provided in the battery module and configured to control the switching unit; and a second control unit provided in the DC/AC inverter and configured to acquire a detection result of the voltage detection unit, the battery module is separable from the DC/AC inverter, the first control unit and the second control unit are connected to be capable of communicating with each other, and the first control unit brings the switching unit into a disconnection state when a voltage of the plurality of battery cells based on a detection result of the state detection remit or the detection result of the voltage detection unit exceeds a threshold.

Further features of the present invention will become apparent from the following description of exemplary embodiments (with reference to the attached drawings).

DESCRIPTION OF THE EMBODIMENTS

Figure 1:
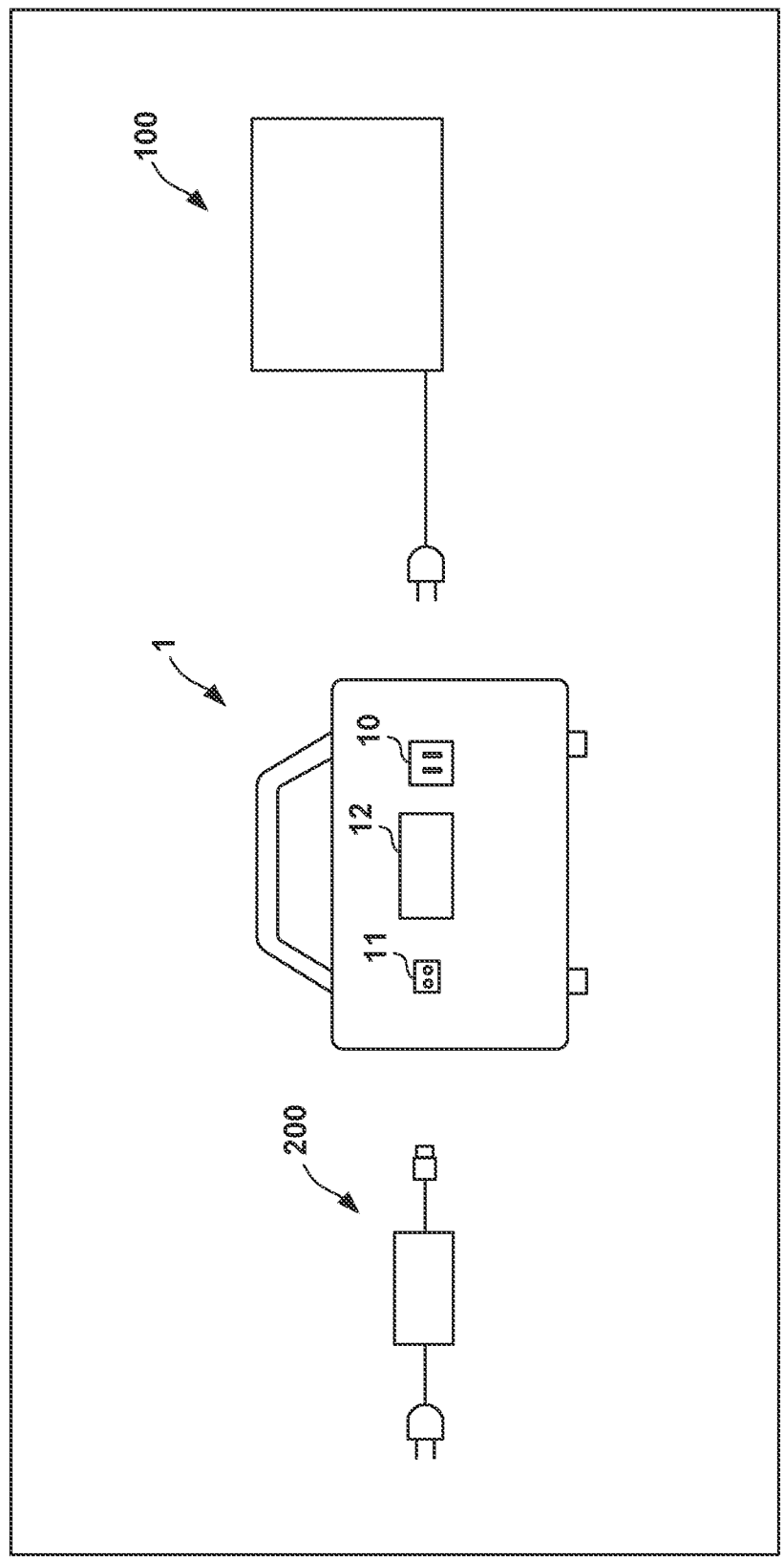
FIG. 1 is a schematic view of an electrical storage device according to one embodiment of the present invention.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

<Outline of Electrical Storage Device>

FIG. 1 is a schematic view of an electrical storage device 1 according to an embodiment of the present invention. The electrical storage device 1 of the present embodiment is a portable electrical storage device, and is used as, for example, a power feeder that supplies power to an electrical load 100 outdoors. The electrical storage device 1 can supply commercial power (in the case of the present embodiment, single-phase alternating current 100 V) connected to a connection portion t (outlet) 10 to the electrical load 100. Examples of the electrical load 100 can include household electrical devices such as a cooker, an air conditioner, a television, lighting equipment, and a dryer. Examples of the electrical load 100 can also include commercial electrical devices such as an electric tool, a large lighting device, and a compressor. The electrical storage device 1 is charged by a charger 200 connected to a connection portion 11. The charger 200 includes an AC/DC converter that converts an AC voltage into a DC voltage.

<Circuit Configuration>

Figure 2:
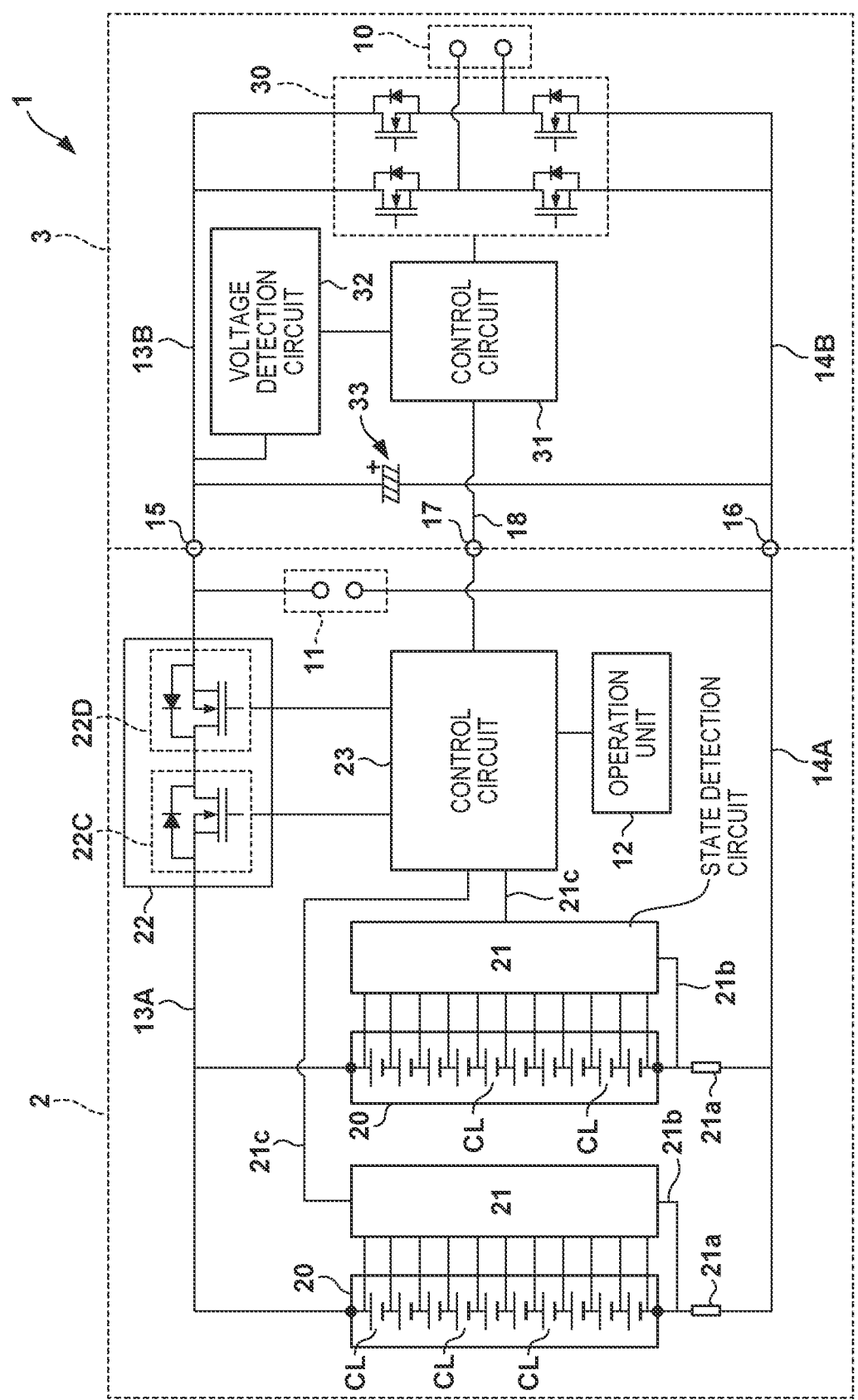
FIG. 2 is a block diagram illustrating a circuit configuration of the electrical storage device in FIG. 1.

FIG. 2 is a block diagram illustrating a circuit configuration of the electrical storage device 1. The electrical storage device 1 includes a battery module 2 that outputs a DC voltage, and a DC/AC inverter 3 that converts the DC voltage output from the battery module 2 into an AC voltage and outputs the AC voltage. The battery module 2 includes a cell stack 20. The cell stack 20 is a battery configured by directly connecting a plurality of battery cells CL. The battery cell CL is, for example, a lithium ion battery cell.

In the present embodiment, a plurality of the cell stacks 20 are connected in parallel between a wiring 13A on a high potential side and a wiring 14A on a low potential side. However, the single cell stack 20 may be provided. The wiring 13A and the wiring 14A are electrically connected to the connection portion 11 which is an electrical connection terminal to which the charger 200 is connected, and charging power is supplied from the connection portion 11 when the cell stack 20 is charged.

The respective cell stacks 20 are provided with state detection circuits 21. The state detection circuit 21 detects a state of each of the battery cells CL. Specifically, the state detection circuits 21 include a circuit that detects a voltage of each of the battery cells CL and detects overcharge or overdischarge. In addition, the state detection circuits 21 include a circuit that detects a current of the cell stack 20. This circuit detects the current of the cell stack 20 from a voltage generated in a current detection resistor 21a connected in series to the cell stack 20 and input via a wiring 21b. The state detection circuits 21 include a balance circuit for each of the battery cells CL. The balance circuit averages the amount of stored power between the battery cells CL. The balance circuit restricts charging of the battery cell CL that has reached a threshold voltage and suppresses a difference in the amount of stored power from the battery cell CL that has not reached the threshold voltage, for example, at the time of charging.

The battery module 2 includes a control circuit 23 that controls the entire battery module 2. The control circuit 23 includes, for example, a processor represented by a CPU, a storage device such as a semiconductor memory, an input/output interface, a communication interface, and the like. The storage device stores a program executed by the processor, data used for processing by the processor, and the like.

An operation unit 12 is connected to the control circuit 23, and the control circuit 23 recognizes a user's instruction (for example, power generation or charging) with respect to the operation unit 12 and executes corresponding processing. The control circuit 23 is connected to each of the state detection circuits 21 via a signal line 21c and acquires state detection results from the state detection circuits 21. For example, the state detection circuits 21 transmit detection results of the voltages of the respective battery cells CL and the currents flowing through the cell stacks 20 to the control circuit 23 by serial communication. The control circuit 23 receives the detection results, and controls on and off of a switching circuit 22 to control charging and discharging of the cell stacks 20.

The switching circuit 22 includes a switching element 22C and a switching element 22D, and is provided on the wiring 13A, In the present embodiment, both the switching element 22C and the switching element 22D are field-effect transistors (FETs) having parasitic diodes. When the switching element 22C is turned on (in a connected state), a current from a terminal 15 to each of the cell stacks 20 (that is, a current in a charging direction) can flow on the wiring 13A. When the switching element 22C is turned off, a disconnected state is formed in which a flow of the current in the charging direction is cut off in the switching element 22C. When the switching element 22D is turned on (in the connected state), a current flowing from each of the cell stacks 20 to the terminal 15 (that is, a current in a discharging direction) can flow on the wiring 13A. When the switching element 22D is turned off, the disconnected state is formed in which the current in the discharging direction is cut off in the switching element 22D.

When it is determined that overcharge or overdischarge has occurred in any of the battery cells CL based on the detection results of the state detection circuits 21, the control circuit 23 controls the switching circuit 22 to suppress further charging or further discharging and protect the battery cells CL.

The DC/AC inverter 3 includes a wiring 13B connected to the wiring 13A via the terminal 15 and a wiring 14B connected to the wiring 14A via a terminal 16. The wiring 13B and the wiring 14B are wirings on an input side to which a DC voltage is input from the battery module 2. A capacitor 33 that stabilizes a voltage is provided between the wiring 13B and the wiring 14B.

The DC/AC inverter 3 includes an inverter circuit 30 that converts a DC voltage between the wirings 13B and 14B into an AC voltage and outputs the AC voltage to the connection portion 10. In the case of the present embodiment, the inverter circuit 30 is an H-bridge circuit having four FETs, and outputs (generates) a single-phase AC voltage by sequentially switching on and off of each of the FETs.

The DC/AC inverter 3 includes a control circuit 31 that controls the entire DC/AC inverter 3. The control circuit 31 includes, for example, a processor represented by a CPU, a storage device such as a semiconductor memory, an input/output interface, a communication interface, and the like. The storage device stores a program executed by the processor, data used for processing by the processor, and the like. The control circuit 31 is connected to the control circuit 23 via a terminal 17 and a signal line 18, and the control circuit 31 and the control circuit 23 can communicate with each other.

The DC/AC inverter 3 also includes a voltage detection circuit 32 that detects a DC voltage on the input side of the DC/AC inverter 3. The voltage detection circuit 32 detects a DC voltage between the wirings 13B and 14B. The control circuit 23 acquires a detection result from the voltage detection circuit 32.

<Absence of DC/DC Converter>

In the electrical storage device 1 having the above configuration, an output voltage of the cell stack 20 is input to the DC/AC inverter 3 without being stepped up, and a DC/DC converter is not provided between the cell stack 20 and the inverter circuit 30. A cost advantage can be obtained by not providing the DC/DC converter.

It is also advantageous in terms of a voltage conversion ratio in the charger 200. Specifically, when a single-phase AC of 100 V is assumed as the Output of the DC/AC inverter 3 as in the present embodiment, a peak voltage thereof is 141 V Therefore, an input DC voltage of the DC/'AC inverter 3 is required to be, for example, about 164 V.

It is assumed that the electrical storage device 1 includes a DC/DC converter, and an output of each of the cell stacks 20 is about 36 V Assuming that a power supply of the charger 200 is a commercial power supply and is single-phase AC of 100 V, the charger 200 is required to convert. AC of 141 V to DC of 36 V and a step-down ratio thereof is about 70%.

It is assumed that the electrical storage device 1 does not include a DC/DC converter as in the present embodiment, and an output of each of the cell stacks 20 is about 164 V. Assuming that a power supply of the charger 200 is a commercial power supply and is single-phase AC of 100 V, the charger 200 is required to convert AC of 141 V to DC of 164 V, and a step-up ratio thereof is about 15%. Since the electrical storage device 1 does not include the DC/DC converter in this manner, it is advantageous in terms of the voltage conversion ratio in the charger 200, and power loss can be reduced.

On the other hand, a higher DC voltage is required as the output voltage of the cell stack 20, and about 164 V is required in the above example since the electrical storage device 1 does not include the DC/DC converter. As a result, the number of the battery cells CL connected in series increases, which causes an increase in a cost. Therefore, a reused battery cell is used as at least some battery cells CL in the cell stack 20 in the present embodiment. All the battery cells CL may be reused battery cells. Alternatively, a reused battery cell and a new battery cell may be selectively used in units of the cell stacks 20.

A reused battery cell tends to be less expensive than a new battery cell. Therefore, even if the number of the battery cells CL connected in series increases, the increase in the cost can be suppressed, and the above-described advantages in the case where the electrical storage device 1 does not include the DC/DC converter can be effectively enjoyed. The reused battery cell may be a reused battery cell diverted from a used vehicle. The used vehicle may be an electric vehicle or a hybrid vehicle. A battery cell mounted on such a vehicle is replaced when it does not satisfy requirements for in-vehicle components; however, it may merely not meet in-vehicle criteria and may have still sufficient performance as a battery cell for other applications. Furthermore, a use history and a state of each battery cell are managed while being mounted on a vehicle, it is easy to select a battery cell in a state suitable for the electrical storage device 1.

<Control Example>

In the configuration in which no DC/DC converter is provided as in the present embodiment, it is difficult to expect insulation between a primary side and a secondary side by the DC/DC converter, That is, in the configuration in which the electrical storage device 1 does not include the DC/DC converter as in the present embodiment, the cell stack 20 and the DC/AC inverter 3 are directly connected. When a voltage is input from the connection portion 10, a voltage of the cell stack 20 rises to cause overvoltage or an overcurrent so that system down may occur. As the case where the voltage is input from the connection portion 10, a case where a load having a capacitor element is connected to the connection portion 10 or a case where a commercial power supply is erroneously connected is assumed. Therefore, the following control is performed in order to avoid such system down.

Figure 3:
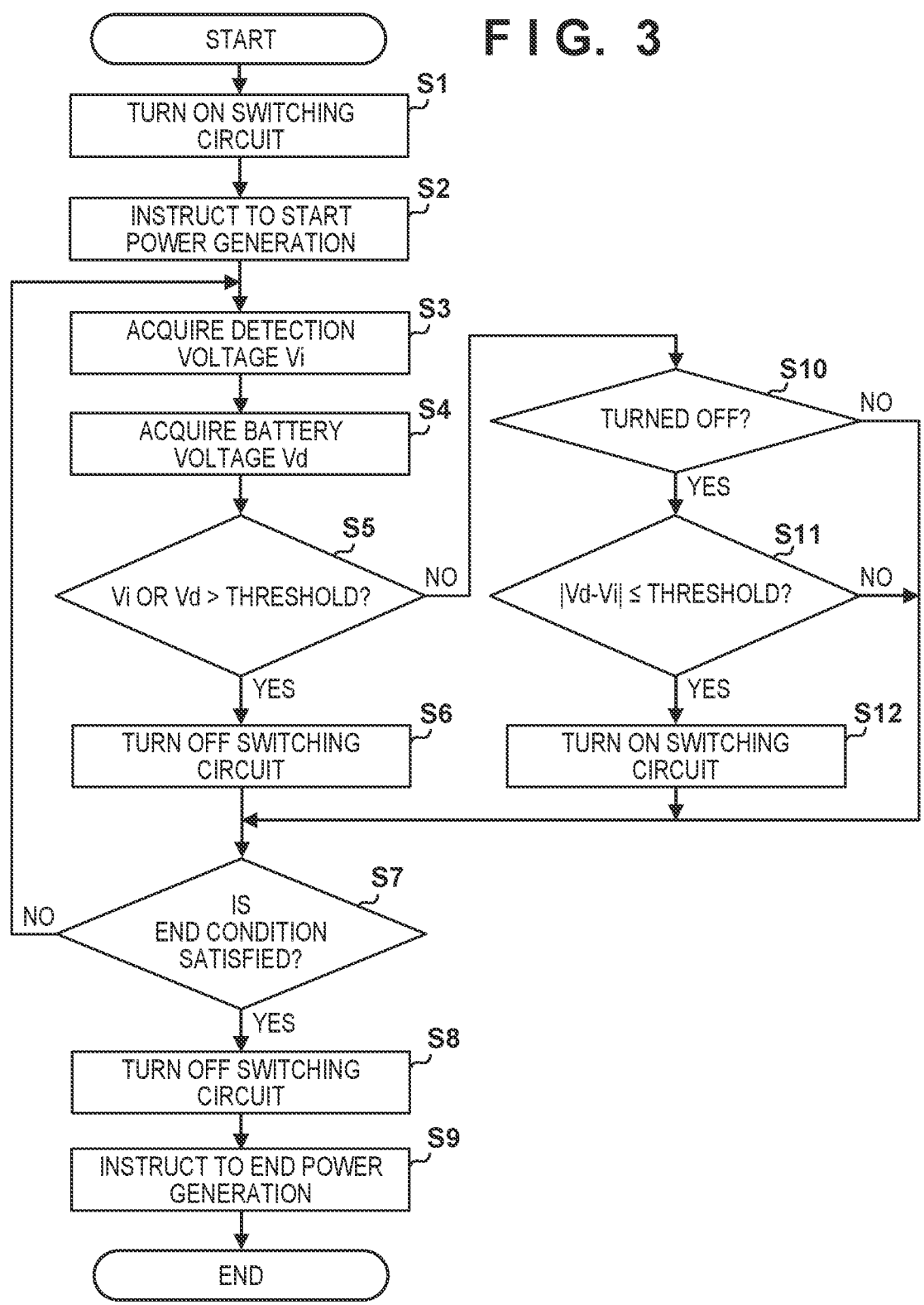
FIG. 3 is a flowchart illustrating a processing example of a control circuit.

FIG. 3 is a flowchart illustrating an example of control executed by the control circuit 23. This control example is, for example, power generation processing executed in a case where a power generation start (AC voltage output start) is instructed from a user via the operation unit 12.

In S1, the switching circuit 22 is turned on. In the present embodiment, both the switching element 22C and the switching element 22D are turned on, but only the switching element 22D may be turned on. As a result, a DC voltage is supplied from the cell stack 20 to the inverter circuit 30. In S2, the control circuit 31 is instructed to start power generation. The control circuit 31 starts control of the inverter circuit 30, and an AC voltage is output from the connection portion 10.

In S3, the control circuit 23 acquires a detection result (denoted as a voltage Vi) of the voltage detection circuit 32 from the control circuit 31. During the power generation, the control circuit 31 periodically acquires the detection result of the voltage detection circuit 32, and the control circuit 23 acquires the detection result from the control circuit 31 in S3. In S4, detection results of the state detection circuits 21 are acquired, and an output voltage (denoted as voltage Vd) of each cell stack 20 is calculated. For example, the voltage Vd of the cell stack 20 can be calculated by integrating voltages of the respective battery cells CL.

In S5, the voltage Vi acquired in S3 and each voltage Vd acquired in S4 are compared with a threshold, and it is determined whether or not either the voltage Vi or the voltage Vd of each of the cell stacks 20 exceeds the threshold. The threshold is, for example, 200 V. The processing proceeds to S6 when it is determined that either the voltage Vi or the voltage Vd exceeds the threshold, and proceeds to S10 when both the voltage Vi and the voltage Vd of each of the cell stacks 20 are equal to or lower than the threshold.

In S6, the switching circuit 22 is turned off. In the present embodiment, both the switching element 22C and the switching element 22D are turned off, but only the switching element 22C may be turned off. As a result, power is prevented from being supplied from the DC/AC inverter 3 to the cell stack 20, and occurrence of an overvoltage and an overcurrent in the cell stack 20 can be avoided.

In S7, it is determined whether or not an end condition is satisfied. The processing proceeds to S8 when the end condition is satisfied, and returns to S3 when the end condition is not satisfied. Examples of the end condition include a case where the user instructs a power generation end (AC voltage output end) via the operation unit 12, and a case where the battery cell CL in an overdischarge state is confirmed on the basis of the detection results of the state detection circuits 21.

In S8, the switching circuit 22 is turned off. Here, both the switching element 22D and the switching element 22C are turned off. In S9, the control circuit 31 is instructed to end the power generation. The control circuit 31 ends the control of the inverter circuit 30, and the AC voltage is no longer output from the connection portion 10.

After the switching circuit 22 is turned off in S5, processing for returning the switching circuit 22 to an on-state is performed in S10 to S12, Specifically, when it is determined in S5 that all of the voltage Vi and the voltages Vd are equal to or lower than the threshold with the switching circuit 22 being off, the switching circuit 22 is returned to the on-state. However, when a voltage difference between the output voltage Vd of the cell stack 20 and the input voltage Vi of the inverter circuit 30 (DC voltage between the wiring 13B and the wiring 14B) is large at the time of return, an excessive current is likely to be instantaneously generated. Therefore, the switching circuit 22 is turned on on condition that the voltage difference is equal to or less than a threshold. Hereinafter, the processing in S10 to S12 will be described.

In S10, it is determined whether or not the switching circuit 22 is turned off. The processing proceeds to S11 when the switching circuit 22 is turned off, and proceeds to S7 when the switching circuit 22 is turned on. In S11, a voltage difference between the output voltage Vd of each of the cell stacks 20 acquired in S4 and the voltage Vi acquired in S3 is calculated and compared with a threshold. The voltage difference is calculated for each of the cell stacks 20, and the comparison with the threshold is also performed for each of the cell stacks 20. If any of the voltage differences is equal to or less than the threshold, the processing proceeds to S12. If at least one voltage difference exceeds the threshold, the processing proceeds to S7. The threshold is, fir example, 1.0 V In S12, the switching circuit 22 is returned to the on-state. The output voltage of the cell stack 20 is applied to the inverter circuit 30. Thereafter, the processing proceeds to S7. According to the above processing, it is possible to avoid a situation in which the voltage of the cell stack 20 rises to cause the overvoltage or the overcurrent so that the system down occurs.

Other Embodiments

Although the case where the electrical storage device 1 is the portable electrical storage device has been exemplified in the above embodiment, the electrical storage device 1 may be a stationary electrical storage device. In addition, the battery module 2 and the DC/AC inverter 3 may be separable, and the battery module 2 may be replaceable.

Although the control circuit 23 and the control circuit 31 are provided in the battery module 2 and the DC/AC inverter 3, respectively, in the above embodiment, one control circuit may be provided as the electrical storage device 1.

Although both the voltage Vi and the voltage Vd are compared with the threshold in the processing of S5 in the above embodiment, only the voltage Vi may be compared, and the processing may proceed to S6 if Vi>threshold, and proceed to S10 if Vi≤threshold.

Summary of Embodiment

The above embodiment at least discloses the following electrical storage device.

1, The electrical storage device (1) according to the above embodiment includes:
- a battery module (2) configured to output a DC voltage; and
- a DC/AC inverter (3) configured to convert the DC voltage output from the battery module into an AC voltage and outputs the AC voltage.
- the battery module (2) including a plurality of battery cells (20, CL) connected in series.
- an output voltage of the plurality of battery cells being input to the DC/AC inverter (3) without being stepped up, and
- at least some of the plurality of battery cells (20, CL) being reused battery cells.

According to this embodiment, the electrical storage device can be configured at a relatively low cost since the DC/DC converter is not required, and a relatively inexpensive reused battery cell is used.

2, The electrical storage device (1) according to the above embodiment further includes:
- a switching unit (22) configured to connect/disconnect an electrical connection between the plurality of battery cells (20, CO and the DC/AC inverter (3).

According to this embodiment, the protection performance of the plurality of battery cells can be improved.

3. The electrical storage device (I) according to the above embodiment further includes:
- a voltage detection unit (32) configured to detect the DC voltage on an input side of the DC/AC inverter (3); and
- a control unit (23, 31) configured to control the switching unit (22) based on a detection result of the voltage detection unit (32),
- the control unit (23, 31) bringing the switching unit into a disconnected state when the detection result of the voltage detection unit exceeds a threshold (S5, S6).

According to this embodiment, when power is input to the DC/AC inverter, an overvoltage or an overcurrent can be prevented from occurring in the plurality of battery cells.

4, In the above embodiment,
- the voltage detection unit (32) is provided in the DC/AC inverter (3),

- the switching unit (22) is provided in the battery module (2),
- the control unit (23, 31) includes:
  - a first control unit (23) provided in the battery module (2) and configured to control the switching unit (22); and
  - a second control unit (31) provided in the DC/AC inverter (3) and configured to acquire the detection result of the voltage detection unit (32), and
- the first control unit (23) and the second control unit (31) are connected to be capable of communicating with each other.

According to this embodiment, control of the battery module and control of the DC/AC inverter can be cooperated with each other while controlling the both individually by the respective control units, 5. In the electrical storage device (I) according to the above embodiment,
- the battery module (2) includes a state detection unit (21) configured to detect a state of each battery cell (CL) of the plurality of battery cells (20, CL).

According to this embodiment, the protection performance of each battery cell can be improved.

6. In the above embodiment,
- the DC/AC inverter (3) outputs the AC voltage corresponding to a commercial AC voltage.

According to this embodiment, the electrical storage device can be used as a power supply of a load that operates with commercial AC power.

7. The electrical storage device (1) according to the above embodiment further includes:
- a connection portion (11) to which a charger (200) that charges the plurality of battery cells (20, CL) is connected.

According to this embodiment, the plurality of battery cells can be charged using the external charger.

8. In the above embodiment,
- the electrical storage device is a portable electrical storage device.

According to this embodiment, the electrical storage device can be used outdoors or the like.

9. In the above embodiment,
- all of the plurality of battery cells are reused battery cells diverted from an in-vehicle power storage device of a used vehicle.

According to this embodiment, the electrical storage device can be configured using relatively inexpensive and highly reliable reused battery cells.

While an embodiment has been described, the invention is not limited to the foregoing embodiments, and various variations/changes are possible within the spirit of the invention.

What is claimed is:

1. An electrical storage device comprising:
a battery module configured to output a DC voltage; and
a DC/AC inverter configured to convert the DC voltage output from the battery module into an AC voltage and outputs the AC voltage, wherein
the battery module includes:
a plurality of battery cells connected in series; and
a state detection unit configured to detect a state of each battery cell of the plurality of battery cells,
an output voltage of the plurality of battery cells is input to the DC/AC inverter without being stepped up,
at least some battery cells of the plurality of battery cells are reused battery cells,
the electrical storage device further comprising:
a switching unit provided in the battery module and configured to connect/disconnect an electrical connection between the plurality of battery cells and the DC/AC inverter;

a voltage detection unit provided in the DC/AC inverter and configured to detect the DC voltage on an input side of the DC/AC inverter;

a first control unit provided in the battery module and configured to control the switching unit; and a second control unit provided in the DC/AC inverter and configured to acquire a detection result of the voltage detection unit, the battery module is separable from the DC/AC inverter, the first control unit and the second control unit are connected to be capable of communicating with each other, and the first control unit brings the switching unit into a disconnected state when a voltage of the plurality of battery cells based on a detection result of the state detection unit or the detection result of the voltage detection unit exceeds a threshold.

2. The electrical storage device according to claim 1, wherein the DC/AC inverter outputs an AC voltage corresponding to a commercial AC voltage.

3. The electrical storage device according to claim 1, further comprising a connection portion to which a charger that charges the plurality of battery cells is connected.

4. The electrical storage device according to claim 1, wherein the electrical storage device is a portable electrical storage device.

5. The electrical storage device according to claim 1, wherein all of the plurality of battery cells are reused battery cells diverted from an in-vehicle power storage device of a used vehicle.

* * * * *